(12) United States Patent
Munjurulimana et al.

(10) Patent No.: US 10,173,728 B2
(45) Date of Patent: Jan. 8, 2019

(54) INTERMITTENT SIDE RAIL ENERGY ABSORBING ELEMENTS AND METHODS OF MAKING THE SAME

(71) Applicant: SABIC Global Technologies B.V., Bergen op Zoom (NL)

(72) Inventors: Dinesh Munjurulimana, Bangalore (IN); Dhanendra Kumar Nagwanshi, Farmington Hills, MI (US); Matthew D. Marks, Waterford, MI (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/522,899

(22) PCT Filed: Oct. 20, 2015

(86) PCT No.: PCT/US2015/056358
§ 371 (c)(1),
(2) Date: Apr. 28, 2017

(87) PCT Pub. No.: WO2016/069320
PCT Pub. Date: May 6, 2016

(65) Prior Publication Data
US 2017/0355399 A1  Dec. 14, 2017

Related U.S. Application Data

(60) Provisional application No. 62/072,749, filed on Oct. 30, 2014.

(51) Int. Cl.
*B62D 21/15* (2006.01)
*B62D 25/08* (2006.01)
*B62D 29/04* (2006.01)

(52) U.S. Cl.
CPC ......... *B62D 21/155* (2013.01); *B62D 21/152* (2013.01); *B62D 25/082* (2013.01); *B62D 29/041* (2013.01)

(58) Field of Classification Search
CPC .... B62D 21/15; B62D 21/152; B62D 21/155; B62D 25/08; B62D 25/082; B62D 25/086; B62D 29/041; B60R 2021/0023
See application file for complete search history.

(56) References Cited

U.S. PATENT DOCUMENTS 8,474,583 B2   7/2013  Nagwanshi et al.
8,562,068 B2 * 10/2013  Yoshida ............... B62D 21/152
                                                296/187.03
(Continued)

FOREIGN PATENT DOCUMENTS

DE   102009015155 A1   9/2010
FR        2702432 A1   9/1994
(Continued)

OTHER PUBLICATIONS

Japanese Publication No. 2012166743; Date of Publication: Sep. 6, 2012; Abstract Only, 2 pages.
(Continued)

*Primary Examiner* — Gregory A Blankenship
(74) *Attorney, Agent, or Firm* — Cantor Colburn LLP

(57) ABSTRACT

A vehicle energy absorbing system for a high-speed, small-overlap impact, comprising: lobes (12) spaced intermittently along a vehicle rail (1), wherein the lobes (12) include an impact arm (14), a reactionary arm (16), and a base (22), wherein a shape of the base (22) is complimentary to a shape of the vehicle rail (1) and wherein the impact arm (14) and the reactionary arm (16) protrude outwardly from the base (22) and the vehicle rail (1), wherein a channel (20) is formed in the space between the base (22), the impact arm
(Continued)

(14), and the reactionary arm (16), wherein the channel (20) extends through the lobe (12) from end to end.

15 Claims, 13 Drawing Sheets

(56) References Cited

U.S. PATENT DOCUMENTS

| | | | |
|---|---|---|---|
| 8,608,231 B1 | 12/2013 | Mendivil et al. | |
| 8,646,793 B1 | 2/2014 | Lam et al. | |
| 8,733,823 B2 | 5/2014 | Brockhoff et al. | |
| 9,027,695 B2 | 5/2015 | Nakamura et al. | |
| 9,061,713 B2* | 6/2015 | Hashimoto | B62D 21/152 |
| 9,211,915 B2* | 12/2015 | Abe | B62D 21/152 |
| 9,290,138 B2 | 3/2016 | Muraji et al. | |
| 9,365,245 B2* | 6/2016 | Donabedian | B62D 25/16 |
| 9,539,966 B2 | 1/2017 | Kato et al. | |
| 9,550,463 B2 | 1/2017 | Hara et al. | |
| 9,676,416 B2 | 6/2017 | Kitakata et al. | |
| 2003/0141712 A1* | 7/2003 | Miyasaka | B60R 19/00 280/784 |
| 2004/0200659 A1* | 10/2004 | Miyasaka | B62D 21/152 180/312 |
| 2008/0252087 A1 | 10/2008 | Roll et al. | |
| 2013/0147233 A1* | 6/2013 | Miyashita | B62D 21/152 296/187.1 |
| 2013/0175128 A1 | 7/2013 | Kumar et al. | |
| 2013/0285414 A1 | 10/2013 | Alavandi et al. | |
| 2014/0159420 A1 | 6/2014 | Hashimoto et al. | |
| 2014/0167450 A1 | 6/2014 | Sotoyama et al. | |
| 2014/0191105 A1 | 7/2014 | Dandekar et al. | |
| 2014/0252741 A1 | 9/2014 | Corby et al. | |
| 2014/0252742 A1 | 9/2014 | Lam et al. | |
| 2014/0361559 A1* | 12/2014 | Sakakibara | B60R 19/34 293/133 |
| 2015/0008703 A1* | 1/2015 | Furusaki | B62D 21/152 296/187.08 |
| 2015/0246651 A1* | 9/2015 | Muraji | B62D 21/152 296/187.1 |
| 2015/0246690 A1* | 9/2015 | Matsumoto | B62D 21/152 296/187.1 |
| 2015/0314742 A1* | 11/2015 | Kato | B62D 21/152 293/155 |
| 2015/0375789 A1* | 12/2015 | Kitakata | B62D 21/152 296/187.1 |
| 2016/0052554 A1* | 2/2016 | Ozawa | B62D 21/152 296/187.09 |
| 2016/0068191 A1* | 3/2016 | Kim | B62D 21/152 280/784 |
| 2016/0159400 A1* | 6/2016 | Matsuoka | B62D 21/152 296/187.11 |
| 2016/0362139 A1* | 12/2016 | Sekiguchi | B62D 21/152 |
| 2017/0101135 A1* | 4/2017 | Kishima | B62D 25/082 |
| 2017/0355399 A1* | 12/2017 | Munjurulimana | B62D 21/155 |

FOREIGN PATENT DOCUMENTS

| | | |
|---|---|---|
| JP | 2012166743 A | 9/2012 |
| JP | 2013241034 A | 12/2013 |
| JP | 2014156199 A | 8/2014 |

OTHER PUBLICATIONS

Japanese Publication No. 2013241034; Date of Publication: Dec. 5, 2013; Abstract Only, 1 page.
Japanese Publication No. 2014156199; Date of Publication: Aug. 28, 2014; Abstract Only, 1 page.
French Patent No. 2702432; Date of Publication: Sep. 16, 1994; Abstract Only, 1 page.
German Patent No. 102009015155; Date of Publication: Sep. 30, 2010; Abstract Only, 1 page.
International Search Report; International Application No. PCT/US2015/056358; dated Jan. 27, 2016, 7 pages.
Written Opinion of the International Search Report; International Application No. PCT/US2015/056358; dated Jan. 27, 2016, 6 pages.
Written Opinion of the International Search Report; International Application No. PCT/US2015/056358; dated Oct. 4, 2016, 6 pages.

* cited by examiner

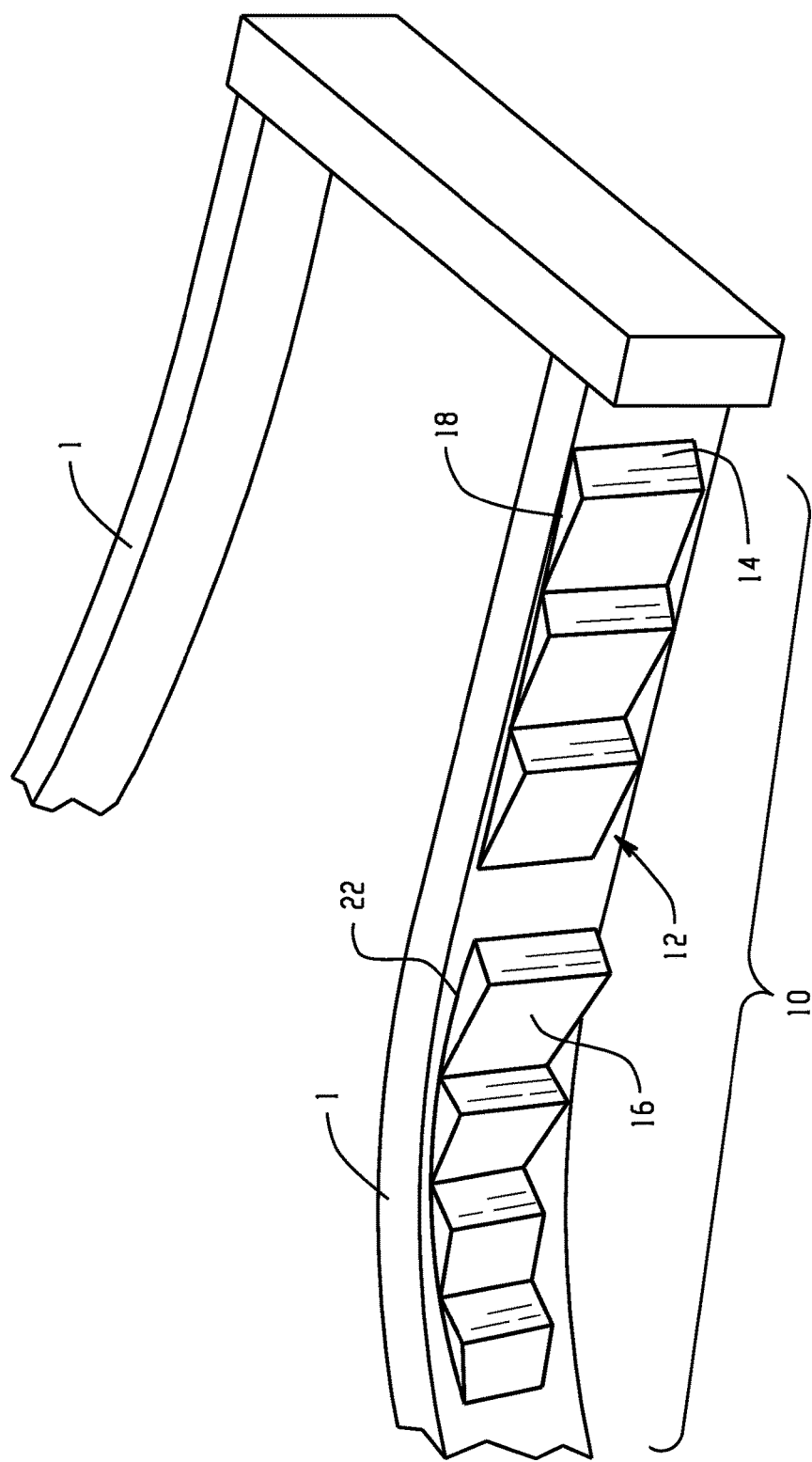

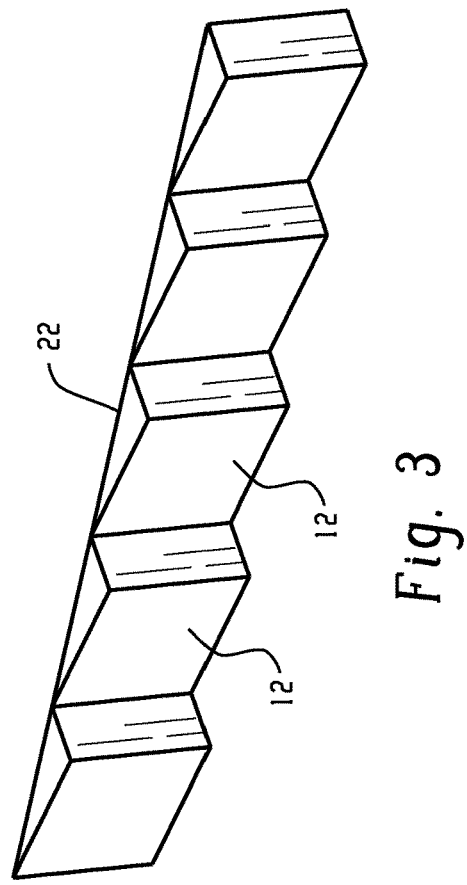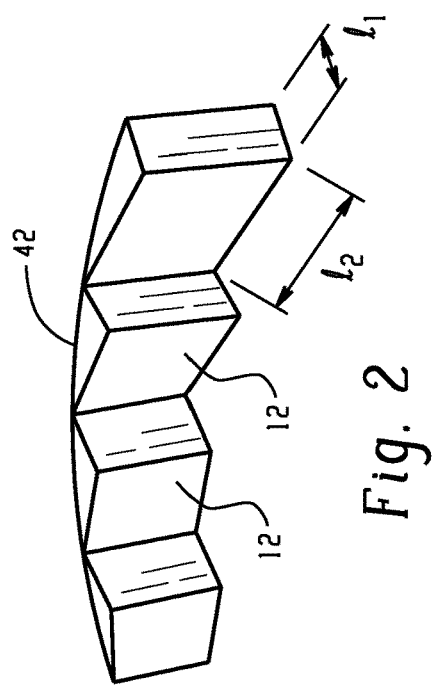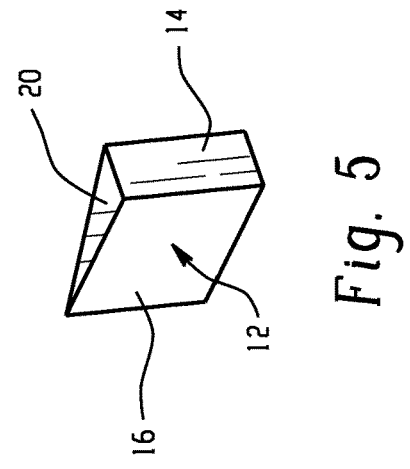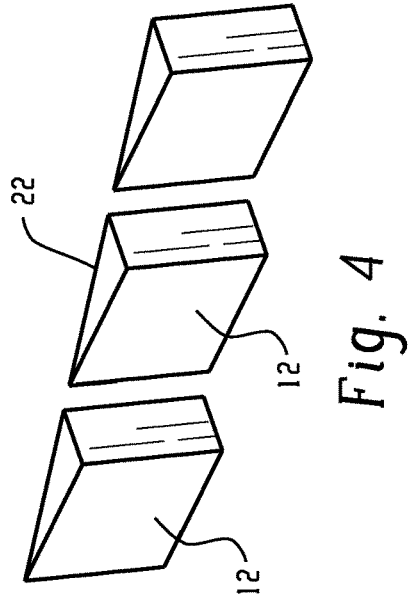

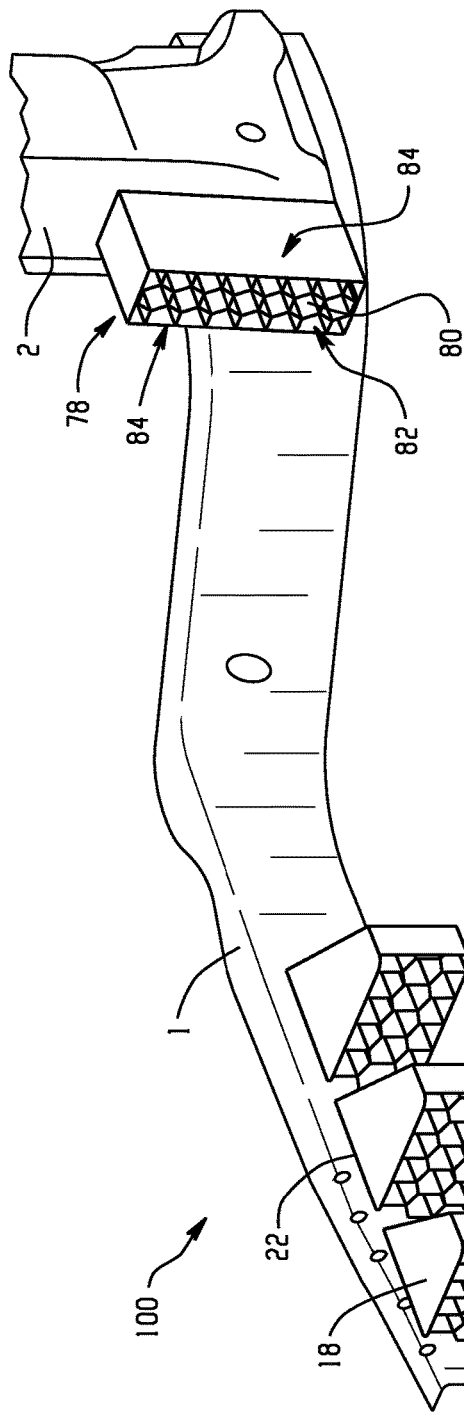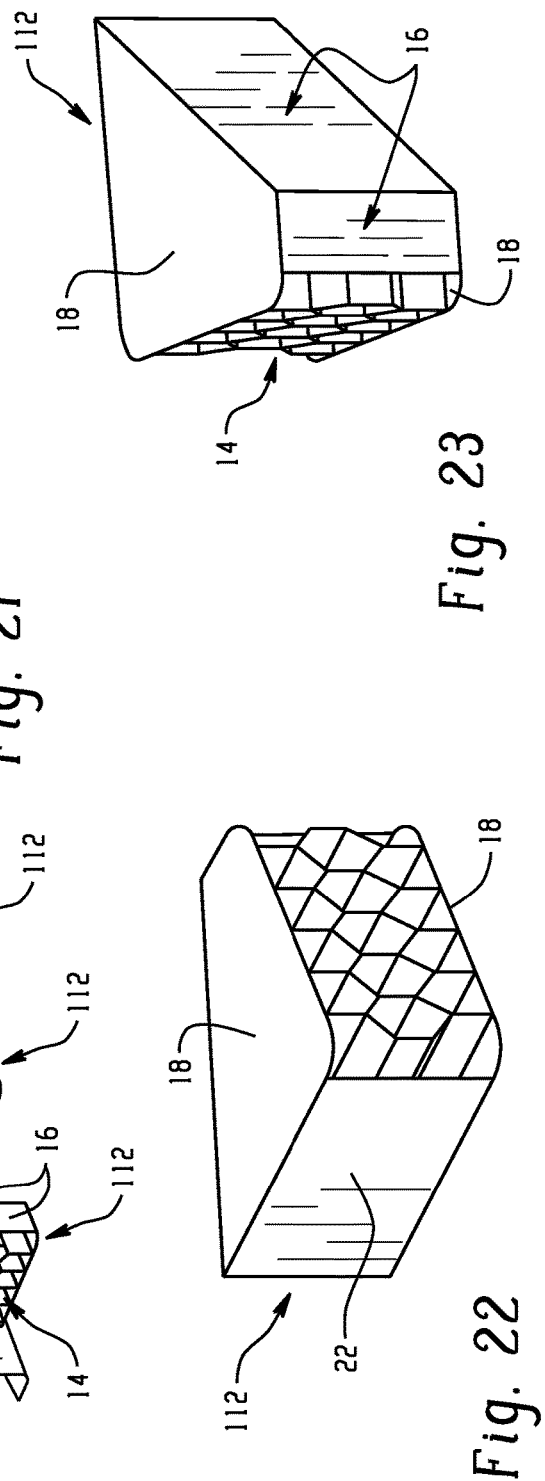
Fig. 21
Fig. 22
Fig. 23

INTERMITTENT SIDE RAIL ENERGY ABSORBING ELEMENTS AND METHODS OF MAKING THE SAME

CROSS REFERENCE TO RELATED APPLICATIONS

This application is a 371 of International Application No. PCT/US2015/056358, filed Oct. 20, 2015, which claims priority to U.S. Application No. 62/072,749 filed Oct. 30, 2014, both of which are incorporated herein by reference in their entirety.

BACKGROUND

Frontal vehicle crashes are the most common type of crash resulting in fatalities. Small-overlap vehicle collisions, i.e., when the front corner of a vehicle collides with another vehicle or an object such as a tree or utility pole, are one class of frontal vehicle crashes. Passing a crash test for this type of collision can be challenging since most energy absorbing structures present in a vehicle are not engaged with the impactor since the overlap is small.

BRIEF DESCRIPTION

A vehicle energy absorbing system for a high-speed, small-overlap impact, includes: lobes spaced intermittently along a vehicle rail, wherein the lobes include an impact arm, a reactionary arm, and a base, wherein a shape of the base is complimentary to a shape of the vehicle rail and wherein the impact arm and the reactionary arm protrude outwardly from the base and the vehicle rail, wherein a channel is formed in the space between the base, the impact arm, and the reactionary arm, wherein the channel extends through the lobe from end to end; wherein the lobes have a geometrical configuration and comprise a material designed to absorb energy upon collision with an impactor; or deflect the vehicle away from an impactor; or transfer energy to the vehicle rails; or absorb energy upon collision with an impactor and deflect the vehicle away from an impactor; or absorb energy upon collision with an impactor and transfer energy to the vehicle rails.

A vehicle energy absorbing system for a high-speed, small-overlap impact, includes: lobes spaced intermittently along a vehicle rail, wherein the lobes include a honeycomb structure protruding outwardly from the vehicle rail at an angle thereto; wherein the lobes comprise a material designed to absorb energy upon collision with an impactor; or deflect the vehicle away from an impactor; or absorb energy upon collision with an impactor and deflect the vehicle away from an impactor.

A method of making a vehicle energy absorbing system, includes: forming lobes comprising an impact arm, a reactionary arm, and a base, wherein a shape of the base is complimentary to a shape of a vehicle rail to which the lobe is attached and wherein the impact arm and the reactionary arm protrude outwardly from the base and the vehicle rail, wherein a channel is formed in the space between the base, the impact arm, and the reaction arm, wherein the channel extends through the lobe from end to end; and attaching the base of the lobes intermittently to the vehicle rail.

The above described and other features are exemplified by the following figures and detailed description.

BRIEF DESCRIPTION OF THE DRAWINGS

Refer now to the figures, which are exemplary embodiments, and wherein the like elements are numbered alike.

FIG. 1 is an isometric view of a vehicle energy absorbing system.
FIG. 2 is an isometric view of interconnected lobes of a vehicle energy absorbing system with a curved base.
FIG. 3 is an isometric view of interconnected lobes of a vehicle energy absorbing system with a flat base.
FIG. 4 is an isometric view of individual lobes of a vehicle energy absorbing system.
FIG. 5 is an isometric view of a lobe of a vehicle energy absorbing system with a channel therein.
FIG. 21 is an isometric view of a vehicle energy absorbing system with a lobe attached to the vehicle rail and a lobe attached to the A pillar.
FIG. 22 is an isometric view of a lobe of the vehicle energy absorbing system of FIG. 21.
FIG. 23 is an isometric view of a lobe having more than 1 reactionary arm of the vehicle energy absorbing system of FIG. 21.

DETAILED DESCRIPTION

Figure 6:
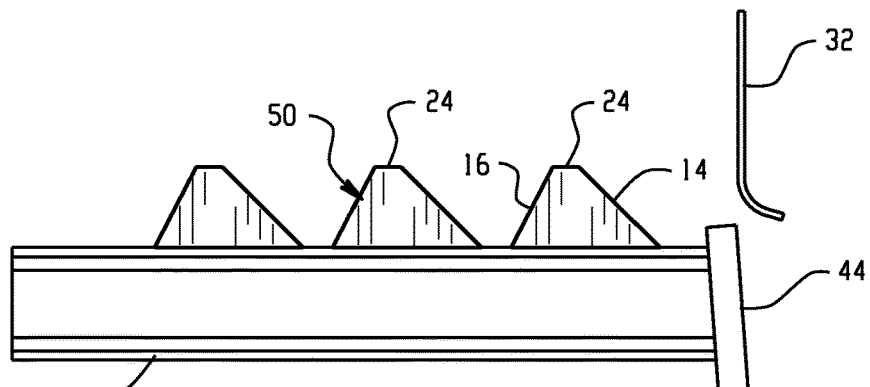
FIG. 6 is a side view of a vehicle rail with lobes attached thereto.

It is estimated that approximately 25% of overall accidents in the United States correspond to small-overlap impacts. Current regulations in the United States do not address this class of impact. The Insurance Institute of Highway Safety (IIHS) recently promulgated a test to address this issue. The test involves a 25% frontal overlap and 40 miles per hour (mph) (64 kilometers per hour (kph)) impact of a vehicle with a rigid barrier. The National Highway Transportation Safety Administration (NHTSA) is currently investigating test scenarios including an oblique impact scenario and is expected to release a test within the next few years. Small overlap frontal collisions pose challenges for vehicle manufacturers since the main crush-zone structures presently available in vehicles are concentrated in the middle fifty percent of the front end of the vehicle. When a crash involves these structures, the occupant compartment of the vehicle can be protected from intrusion and front airbags and safety belts can effectively restrain and protect occupants. Small overlap frontal collisions are primarily directed to a vehicle's outer edges, which are not protected by the presently available crush-zone structures in vehicles. Forces from the collision go directly to the front wheel, suspension system, and firewall. The front wheel can be forced rearward into the footwell of the vehicle, contributing even more intrusion into the occupant compartment and resulting in serious leg and foot injuries. The use of a vehicle energy absorbing system for a high-speed, small overlap impact can reduce the magnitude of forces on the front wheel, suspension system, and firewall during such a collision. The use of a vehicle energy absorbing system for a high-speed, small overlap impact can reduce the intrusion into the occupant compartment. The vehicle energy absorbing system can be located on a structural member, e.g., vehicle rail, an A pillar, crash can, etc., of the vehicle in order to absorb or transfer energy or deflect the vehicle away from an impactor during a collision. Impactor refers to a rigid member such as another vehicle, pole, wall, tree, barrier, etc.

The vehicle energy absorbing system for a high-speed, small overlap impact can include lobes spaced intermittently along a vehicle member including along a vehicle rail, along an A pillar of the vehicle, or along a combination of the vehicle rail and the A pillar. Optionally, the lobes can be placed on crash cans present at either end of a bumper beam assembly on the vehicle. The lobes can include an impact arm, a reactionary arm, and a base. The lobes can include multiple (i.e., greater than 1) impact arms, reactionary arms, or bases in any one lobe. It is to be understood that reference herein to an impact arm, a reactionary arm, or a base, also refers to embodiments in which multiple impact arms, reactionary arms, or bases are present. A shape of the base can be complimentary to a shape of the vehicle member to which it will be attached, e.g., a vehicle rail. For example, if the vehicle rail has a flat shape, the base can have a flat shape. If the vehicle rail has a curved shape, the base can have a curved shape. The impact arm and the reactionary arm can protrude outwardly from the base and the vehicle member (e.g., vehicle rail) such that a channel can be formed in the space located between the base, the impact arm, and the reactionary arm. The channel can extend through the lobe from end to end, e.g., from a top end to a bottom end of the lobe. Stated another way, the channel can extend from end to end of the lobe in the vertical direction. A cover can be placed on either or both of the ends of the lobe over the channel.

The lobes can have a geometrical configuration designed to absorb energy upon collision with an impactor; or deflect the vehicle away from an impactor; or transfer energy to the vehicle rails; or absorb energy upon collision with an impactor and deflect the vehicle away from the impactor; or absorb energy upon collision with an impactor and transfer energy to the vehicle rails. The lobes can comprise a material designed to absorb energy upon collision with an impactor; or deflect the vehicle away from an impactor; or transfer energy to the vehicle rails; or absorb energy upon collision with an impactor and deflect the vehicle away from the impactor; or absorb energy upon collision with an impactor and transfer energy to the vehicle rails.

The number of lobes present is not limited and can be any number that will provide the desired level of protection to the occupant compartment of the vehicle. For example, the number of lobes can be greater than or equal to 2; for example, greater than or equal to 3; for example, greater than or equal to 5; for example, greater than or equal to 10; for example, greater than or equal to 15; for example, greater than or equal to 20; for example, greater than or equal to 25. The lobes can be individual lobes. The lobes can be interconnected with one another. The lobes in the vehicle energy absorbing system can comprise a combination of individual lobes and interconnected lobes.

The lobes can comprise a metallic material, a polymeric material, a composite material, or a combination comprising at least one of the foregoing. The lobes can comprise any polymeric material or combination of polymeric materials that can be formed into the desired shape and provide the desired properties. Exemplary materials include polymeric materials as well as combinations of polymeric materials with elastomeric materials, and/or thermoset materials. In one embodiment, the polymeric materials comprise thermoplastic materials. Possible polymeric materials include polybutylene terephthalate (PBT); acrylonitrile-butadiene-styrene (ABS); polycarbonate (LEXAN™ and LEXAN™ EXL resins, commercially available from SABIC's Innovative Plastics business); polyethylene terephthalate (PET); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC's Innovative Plastics business); blends of polycarbonate/PET/PBT; PBT and impact modifier (XENOY™ resins, commercially available from SABIC's Innovative Plastics business); polyamides (Nylon 6, Nylon 6-6, Nylon 6-9, Nylon 6-10, Nylon 6-12, Nylon 11, Nylon 12, Nylon 4-6, etc.); phenylene sulfide resins; polyvinyl chloride PVC; high impact polystyrene (HIPS); polyolefins, e.g., low/high density polyethylene (L/HDPE), polypropylene (PP), expanded polypropylene (EPP); polyethylene and fiber composites; polypropylene and fiber composites (AZDEL Superlite™ sheets, commercially available from Azdel, Inc.); long fiber reinforced thermoplastics (VERTON™ resins, commercially available from SABIC's Innovative Plastics business) thermoplastic olefins (TPO), and carbon fiber reinforced polymeric composites (CFRP), as well as combinations comprising at least one of the foregoing.

An exemplary filled resin is STAMAX™ resin, which is a long glass fiber filled polypropylene resin also commercially available from SABIC's Innovative Plastics business. Some possible reinforcing materials include fibers, such as glass, carbon, and so forth, as well as combinations comprising at least one of the foregoing; e.g., long glass fibers and/or long carbon fiber reinforced resins. For example, carbon fiber reinforced polymeric composites can be utilized to form the lobes. Carbon fiber reinforced polymeric composites can be used as a coating (e.g., skin) on the lobes to provide the desired structural integrity to the lobes. The lobes can be formed from combinations comprising at least one of any of the above-described materials.

The lobes have a geometrical shape that can include a triangle, a cone, a pyramid, a cylinder, a square, a rectangle, a parallelogram, a trapezium, an ellipse, a hexagon, or a combination comprising at least one of the foregoing. For example, the lobe can include a triangular pyramid, a square pyramid, a hexagonal pyramid, a triangular prism, a pentagonal prism, a hexagonal prism, a cube, a cuboid, a cone with a flat top, a pentagonal cone, a pentagonal pyramid, a pentagonal pyramid with a flat top, or a combination comprising at least one of the foregoing. The impact arm or the reactionary arm or the impact arm and the reactionary can include a straight shape (i.e., a straight line), a corrugated shape, a trapezoidal shape, a saw-tooth shape, a sinusoidal shape, a lamellar shape, a triangular shape, an abs(sin) shape, a cycloid shape, or a combination comprising at least one of the foregoing.

The impact arm and the reactionary arm can converge from the base at an angle. The impact arm and the reactionary arm can converge toward one another and meet at a point or junction area located between the impact arm and the reactionary arm. The impact arm and the reactionary arm can converge toward an interface disposed between the arms. The angle at which the impact arm and the reactionary arm converge from the base can be 0° to 50°, for example, 0° to 45°, for example, 0° to 25°, for example 5° to 15°. The impact arm can have a length, $l_1$, and the reactionary arm can have a length, $l_2$. The length, $l_1$ can be equal to $l_2$, or $l_1$ can be greater than $l_2$, or $l_1$ can be less than $l_2$. The lobes can include a multilayer structure in the channel. The lobes can include ribs disposed between layers in the channel.

The lobes can include a honeycomb structure protruding outwardly from the vehicle rail at an angle thereto. The angle at which the honeycomb structure converges can be 0° to 50°, for example, 0° to 45°, for example, 0° to 25°, for example 5° to 15°. After collision with an impactor, the honeycomb structure can be crushed axially along a length, $l_h$. The honeycomb structure can be attached to the rails via structural adhesives. The honeycomb structure can be attached to the rails with the help of fasteners. A base can optionally be present on the honeycomb structure to facilitate attachment to the vehicle.

The base can be attached to the vehicle, e.g., vehicle rail, A pillar, crash can, etc., by any method that will provide the desired level of attachment and will not cause the lobe to detach upon a collision. The base can be attached to the vehicle by hooks, a snap-fit connection, a mechanical fastener, a structural adhesive, or a combination comprising at least one of the foregoing. Holes or attachment points can be located on the vehicle at the position at which the lobe will be attached. For example, the base can be attached to the vehicle by hooks that can be inserted into corresponding holes on the vehicle, for example, corresponding holes on the vehicle rail. A vehicle can include the vehicle energy absorbing system.

Methods of making a vehicle energy absorbing system are also contemplated. A method of making a vehicle energy absorbing system can include forming lobes and attaching the lobes to a vehicle member. The lobes can include an impact arm, a reactionary arm, and a base. A shape of the base can be complimentary to a shape of the vehicle member to which it will be attached, e.g., vehicle rail, A pillar, crash can, etc. The impact arm and the reactionary arm can protrude outwardly from the base and the vehicle member. A channel can be formed in the space between the base, the impact arm, and the reactionary arm. The channel can extend vertically through the lobe from end to end. The lobes can have a geometrical configuration and can comprise a material designed to absorb energy upon collision with an impactor; or deflect the vehicle away from an impactor; or transfer energy to the vehicle rails; or absorb energy upon collision with an impactor and deflect the energy away from an impactor; or absorb energy upon collision with an impactor and transfer energy to the vehicle rails. Attaching the lobes to a vehicle member can include hooks, a snap-fit connection, a mechanical fastener, a structural adhesive, or a combination comprising at least one of the foregoing.

A method of making a vehicle energy absorbing system can include forming lobes and attaching the lobes to a vehicle member. The lobes can include a honeycomb structure protruding outwardly from the vehicle rail at an angle thereto. The angle at which the honeycomb structure converges can be 0° to 50°, for example, 0° to 45°, for example, 0° to 25°, for example 5° to 15°. The method can include forming in individual lobes or interconnected lobes, where the number of lobes is greater than or equal to 2 lobes.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 illustrates a vehicle rail 1 with an energy absorbing system 10 attached thereto. The energy absorbing system in FIG. 1 includes a lobe 12 having an impact arm 14 and a reactionary arm 16, wherein the impact arm is oriented toward the direction of impact. Base 22 is attached to the vehicle rail 1, while cover 18 is disposed over a channel 20 (see FIG. 5) formed by the impact arm 14, reactionary arm 16, and base 22. As illustrated in FIG. 1, the impact arm 14 and the reactionary arm 16 protrude outwardly from the base 22. FIG. 1 demonstrates that the lobes 12 can comprise several interconnected lobes 12 and that the energy absorbing system 10 can comprise several lobes 12. In FIG. 1, the lobes 12 are intermittently dispersed across vehicle rail 1. FIGS. 2 through 4 illustrate various embodiments of lobes 12. For example, FIG. 2 illustrates lobes 12 with a curved base 42, while FIGS. 3 and 4 illustrate lobes 12 with base 22. In FIGS. 2 and 3 lobes 12 are interconnected, while in FIG. 4, lobes 12 are not connected, i.e., are individual lobes 12.

Impact arm 14 can have a length, $l_1$, while reactionary arm 16 can have a length, $l_2$. As illustrated in FIGS. 1 to 4, $l_2$ is greater than $l_1$. It is to be understood, however, that $l_1$ can be greater than $l_2$ or $l_1$ and $l_2$ can be equal to one another.

Figure 7:
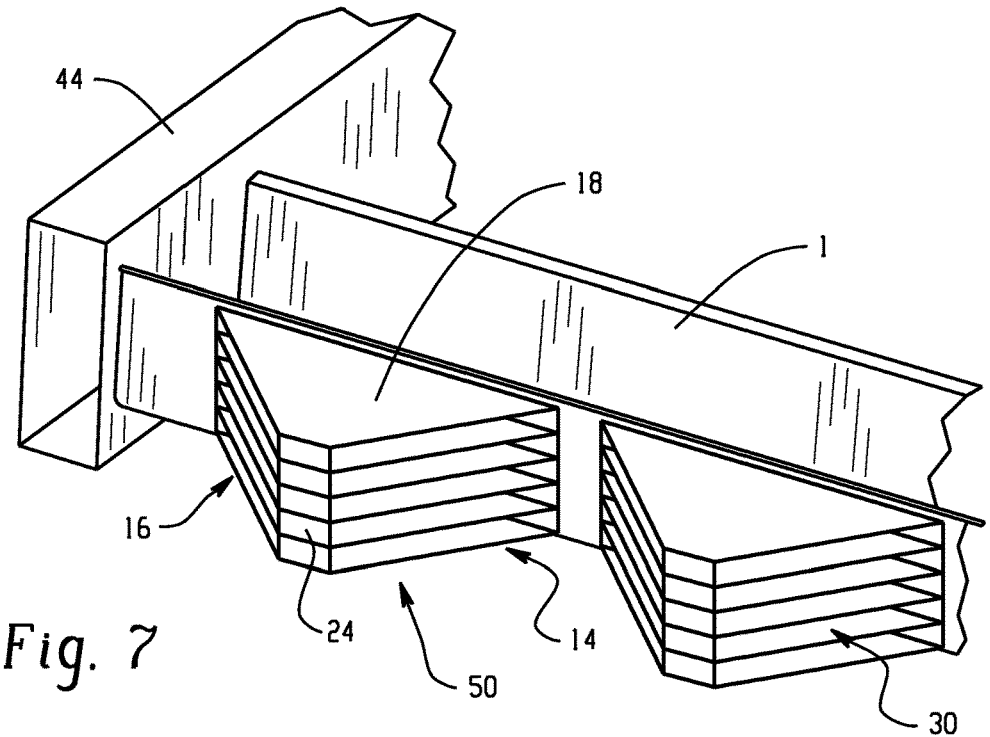
FIG. 7 is an isometric view of the vehicle rail with lobes attached thereto of FIG. 6.
Figure 8:
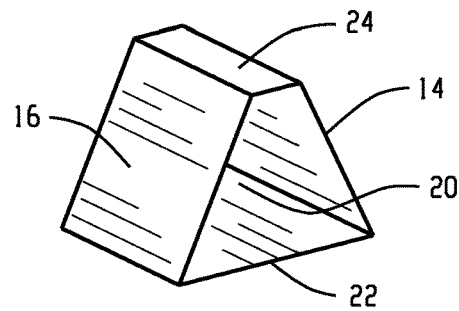
FIG. 8 is an isometric view of a lobe of FIG. 6 with a channel therein.
Figure 9:
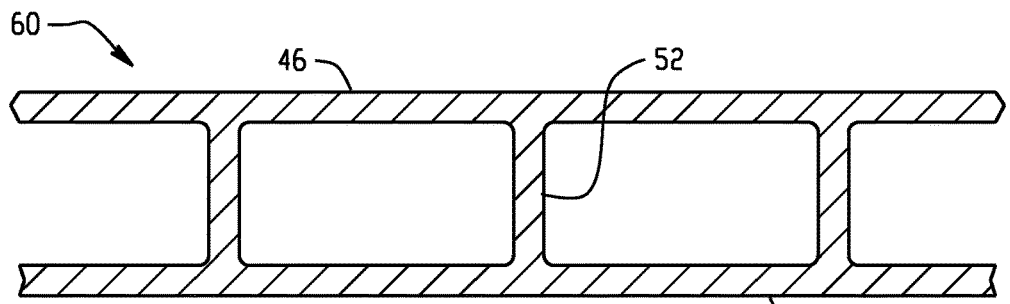
FIG. 9 is a view of a multilayer structure with ribs dispersed therein.
Figure 10:
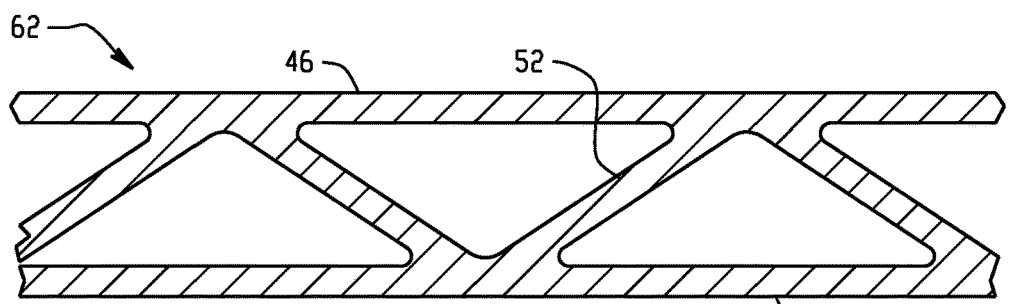
FIG. 10 is a view of a multilayer structure with ribs dispersed therein.
Figure 11:
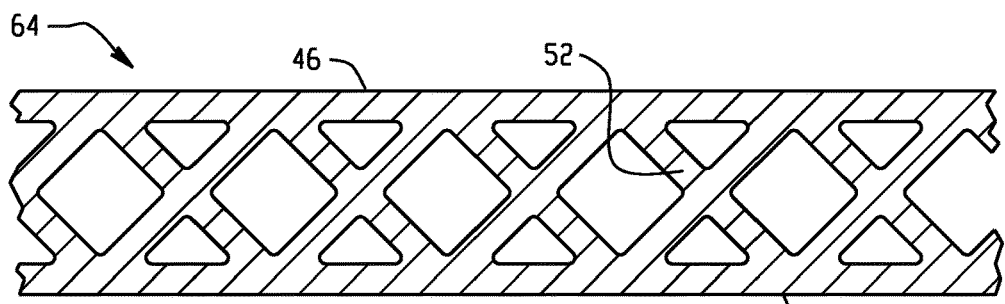
FIG. 11 is a view of a multilayer structure with ribs dispersed therein.
Figure 12:
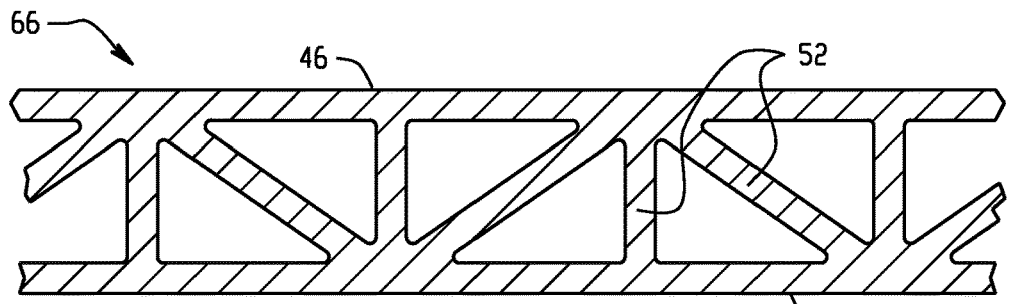
FIG. 12 is a view of a multilayer structure with ribs dispersed therein.

Turning now to FIGS. 6 and 7, conical lobes 50 are illustrated having impact arm 14, reactionary arm 16, and base 22 attached to vehicle rail 1. Conical lobes 50 include impact arm 14 and reactionary arm 16 with an interface 24 located between the impact arm 14 and the reactionary arm 16 forming a flat surface or interface 24 therebetween. Impact arm 14 and reactionary arm 16 are removed in FIG. 7 in order to demonstrate the presence of a multilayer structure 30 in the conical lobe 50. Front beam 44 of a vehicle is also illustrated in FIGS. 6 and 7. In FIG. 6 a multilayer structure 30 is present on conical lobe 50. As can be seen in FIG. 7, multiple layers are located between covers 18 located at the top and bottom of the lobe 12. Channel 20 can be seen in FIG. 8 extending through the lobe 50. The multilayer structure 30 in FIG. 7 is located in the channel 20. Ribs can be dispersed between layers in the multilayer structure 30. For example, as seen in FIGS. 9 to 12, ribbed multilayer structures 60, 62, 64, and 66 respectively have a first wall 46, a second wall 54, and a rib 52 disposed therebetween. The ribs 52 can have any configuration that will help achieve the desired mechanical and structural properties of a support arm and/or tray table. Ribs 52 can be attached to one wall of the multiwall structure 60, 62, 64, 66, and/or can be attached to any two walls of the multilayer structure 60, 62, 64, 66, and/or can be floating in the various layers of the multilayer structure 60, 62, 64, 66 (e.g., not attached to any walls of the multilayer structure 60, 62, 64, 66). In FIG. 9, the ribs 52 are illustrated as being perpendicularly disposed between the first wall 46 and the second wall 54, while in FIG. 10, the ribs 52 are disposed at an angle, i.e., diagonally (e.g., greater than or equal to 45°) between the first wall 46 and the second wall 54. In FIG. 11, the ribs 52 form a generally "X" shape and are disposed diagonally between first wall 46 and second wall 54, while in FIG. 12, the ribs 52 are disposed diagonally and perpendicularly between the first wall 46 and the second wall 54.

Figure 13:
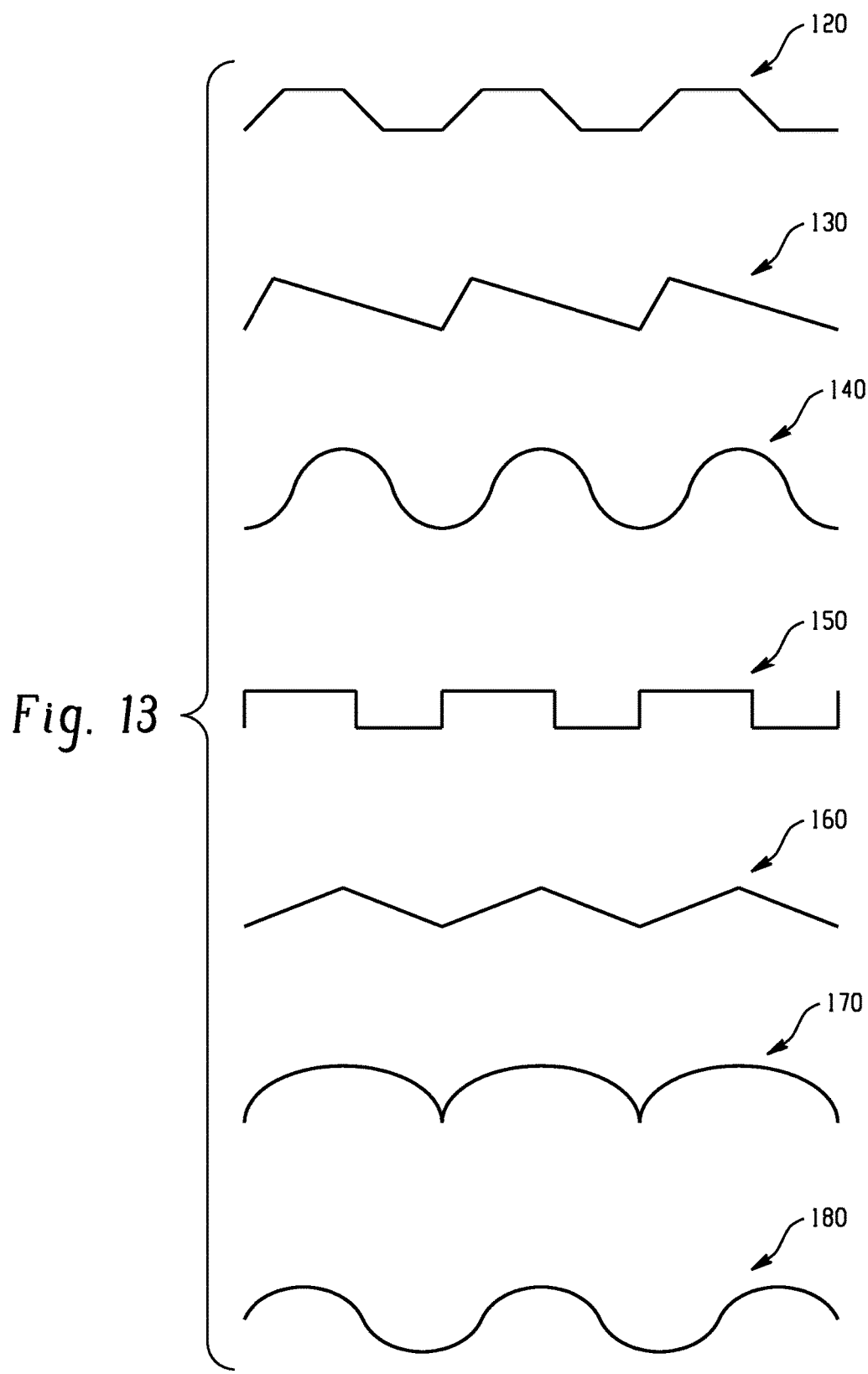
FIG. 13 is a view of various shapes for the components of the vehicle energy absorbing system.
Figure 14:
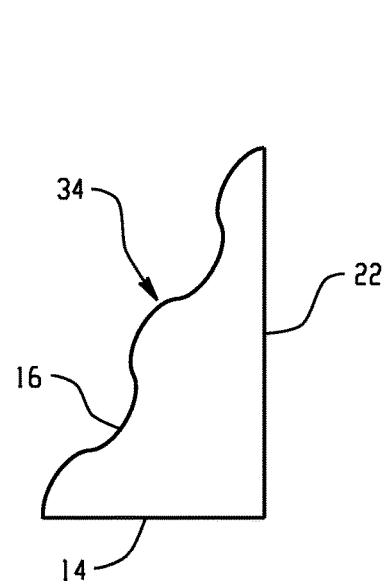
FIG. 14 is a view of a lobe with a corrugated shape.

The impact arm 14 or the reactionary arm 16 can comprise any shape that provides the desired properties for the lobe. For example, as demonstrated in FIGS. 13 and 14, the impact arm 14 or the reaction arm 16 can comprise a corrugated shape 34, a trapezoidal shape 120, a saw-tooth shape 130, a sinusoidal shape 140, a lamellar shape 150, a triangular shape 160, an abs(sin) shape 170, a cycloid shape 180, or a combination comprising at least one of the foregoing. As seen in FIG. 14, the reactionary arm has a corrugated shape 34.

Figure 15:
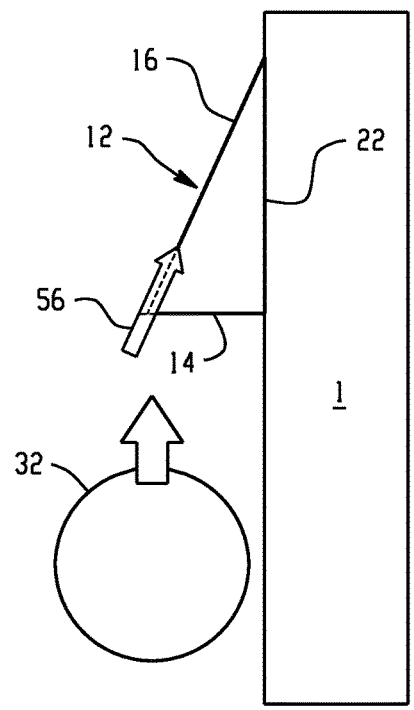
FIG. 15 is a view of a vehicle energy absorbing system attached to a vehicle rail.

Turning now to FIG. 15, impactor 32 is seen as moving toward impact arm 14 with the direction of force 56 moving along reactionary arm 16. The vehicle energy absorbing system 10 disclosed herein can absorb energy from the impactor 32 once the collision occurs. The vehicle energy absorbing system 10 disclosed herein can deflect the vehicle away from the impactor 32 once the collision occurs. The vehicle energy absorbing system 10 disclosed herein can transfer energy to the vehicle rails. The vehicle energy absorbing system 10 disclosed herein can absorb energy from the impactor 32 once the collision occurs and can deflect the vehicle away from the impact 32 once the collision occurs. The vehicle energy absorbing system 10 disclosed herein can absorb energy from the impactor 32 once the collision occurs and can transfer energy to the vehicle rails. The various components of the vehicle energy absorbing system 10 disclosed herein can assist in completing these tasks. Absorption of the forces, transfer of the forces, and deflection of the vehicle away from the forces can prevent or reduce intrusion into the occupant compartment of the vehicle, thereby reducing injuries suffered by any occupants of the vehicle. Crushing of the lobes 12 can occur in the direction orthogonal to the vehicle member to which it is attached. For example, as shown in FIG. 15, crushing of the lobe 12 can occur in the direction orthogonal to vehicle rail 1. If failure of a lobe 12 occurs, the next lobe in series can absorb the energy or deflect the vehicle away and each successive lobe will continue to do the same if the lobe immediately preceding it fails.

Figure 16:
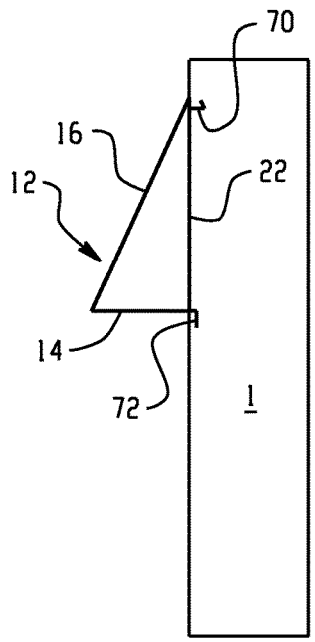
FIG. 16 is a side view of an attachment mechanism for a vehicle energy absorbing system.
Figure 17:
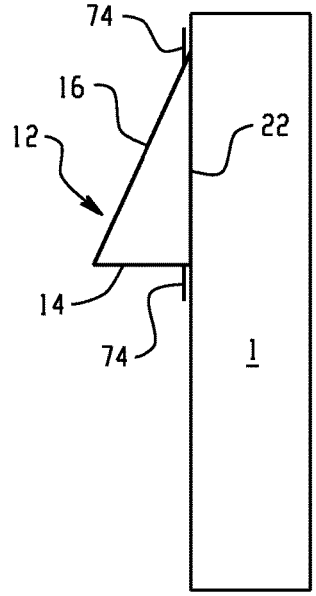
FIG. 17 is a side view of an attachment mechanism for a vehicle energy absorbing system.
Figure 18:
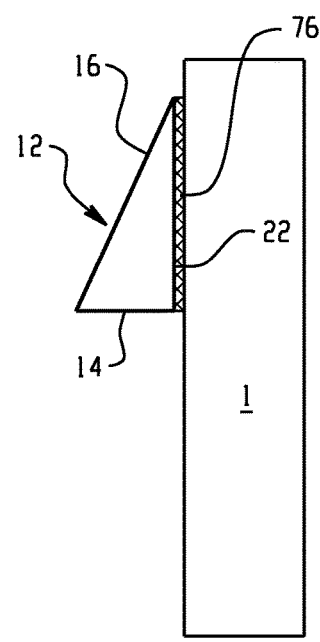
FIG. 18 is a side view of an attachment mechanism for a vehicle energy absorbing system.

FIGS. 16 to 18 show various attachment mechanisms for attaching the lobes 12 to the vehicle member, e.g., rail 1. In FIG. 16, a snap-fit 70 and hook 72 attachment are illustrated. In FIG. 17, a mechanical fastener 74 is illustrated. In FIG. 18, a structural adhesive 76 is illustrated as connecting the lobe 12 to the vehicle rail 1. Mechanical fasteners can include screws, nails, bolts, clips, clamps, pins, etc. Structural adhesives can include epoxy, acrylic, or urethane adhesives. The snap-fit 70, hook 72, and mechanical fasteners 74 can comprise any material that will give the desired adhesion between the base 22 of the lobe 12 and the vehicle member to which it is attached, e.g., vehicle member. The attachment mechanisms can attach directly to the vehicle rails 1.

Impact arm 14 of lobe 12 will come into contact with impactor 32 before reactionary arm 16. Impact arm 14 and reactionary arm 16 can absorb energy from impactor 32, with each successive lobe absorbing and transferring energy away from the vehicle rail 1. Impact arm 14 and reactionary arm 16 can deflect the vehicle away from impactor 32. Impact arm 14 can absorb energy from impactor 32 and reactionary arm 16 can deflect the vehicle away from the impactor.

Figure 19:
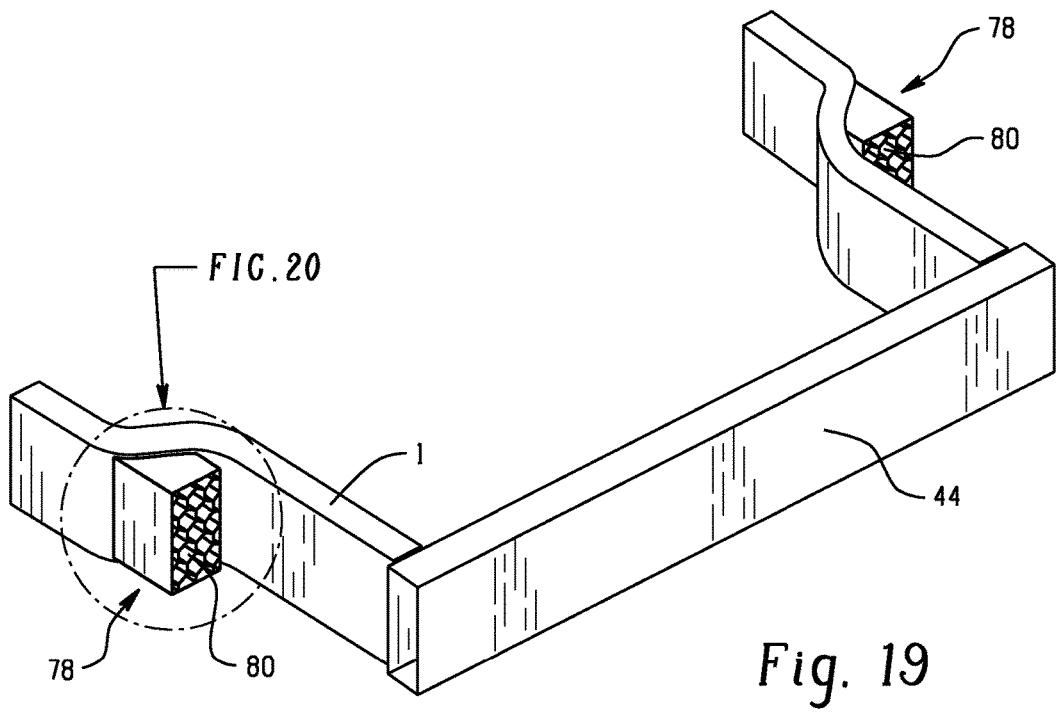
FIG. 19 is an isometric view of a vehicle energy absorbing system with a honeycomb structure.
Figure 20:
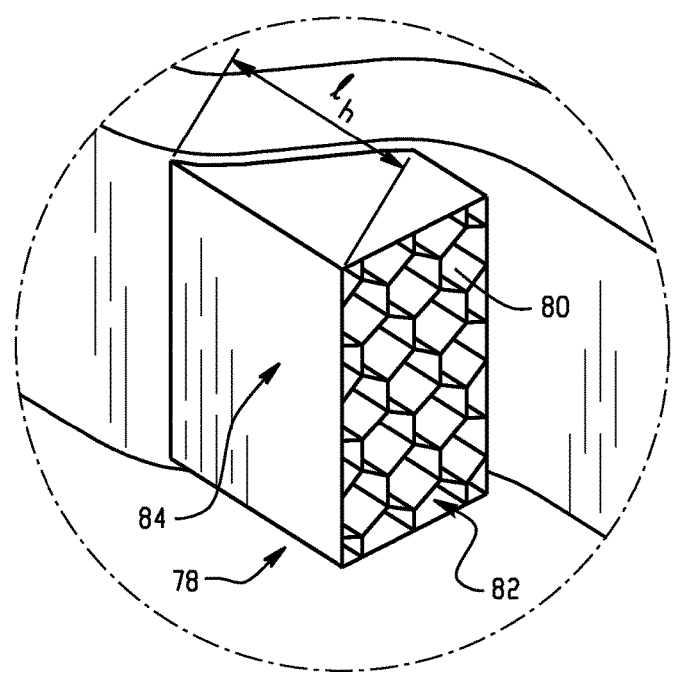
FIG. 20 is a view of the circular portion in FIG. 19.

In FIGS. 19 and 20, a vehicle energy absorbing system 1 with lobe 78 having a honeycomb structure 80 is illustrated. Lobes 78 can be spaced intermittently along a vehicle member, e.g., vehicle rail 1. The honeycomb structure 80 can protrude outwardly from the vehicle rail at an angle thereto. Impact arm 82 and reactionary arm 84 can absorb energy upon collision with an impactor or deflect the vehicle away from the impactor or absorb energy upon collision with an impactor and deflect the vehicle away from the impactor. The honeycomb structure 80 can extend from the base at an angle of 0° to 45°. Upon an impact, the honeycomb structure 80 will crush axially along a length, $l_h$.

Turning now to FIGS. 21, 22, and 23, an energy absorbing system 100 is illustrated. As can be seen in FIG. 21, lobes 112 are connected to vehicle rail 1 and lobe 84 is connected to an A pillar of a vehicle. As can be seen in FIGS. 21, 22, and 23, lobes 112 can include impact arm 14, reactionary arm 16, and base 22, where base 22 can be connected to vehicle rail 1. Lobe 112 can include multiple reactionary arms 16 as illustrated in FIG. 23.

Figure 24:
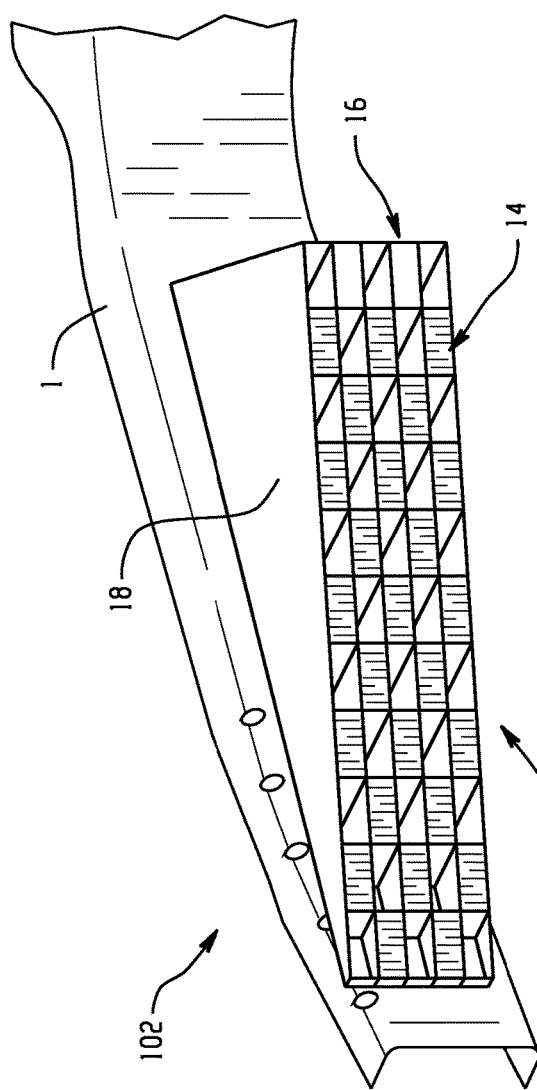
FIG. 24 is an isometric view of a vehicle energy absorbing system with a lobe attached to a vehicle rail.
Figure 26:
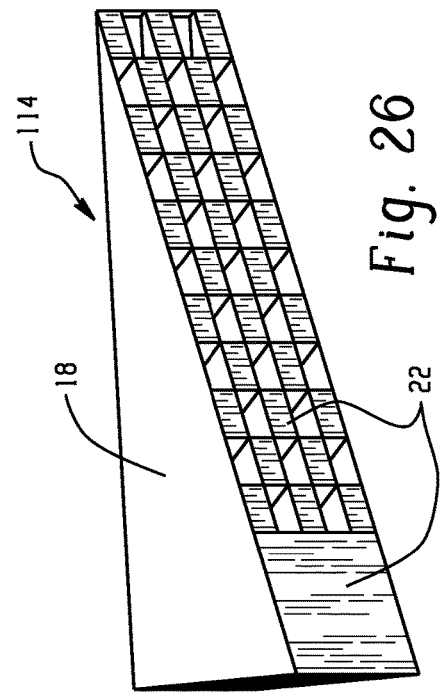
FIG. 26 is an isometric back view of the lobe of FIG. 24.
Figure 25:
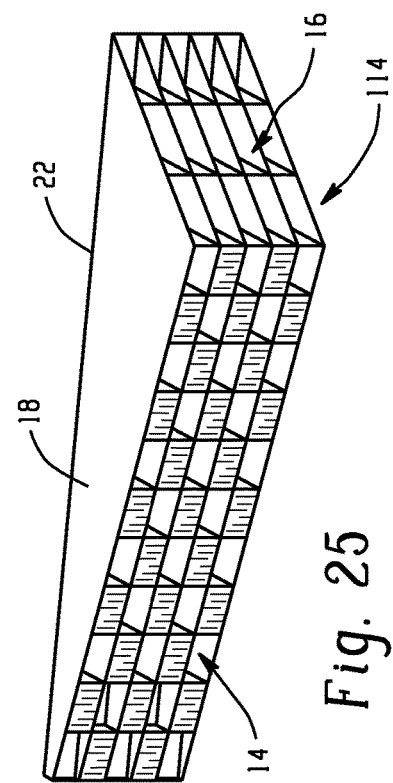
FIG. 25 is an isometric front view of the lobe of FIG. 24.

FIGS. 24, 25, and 26 illustrate further another energy absorbing system 102 with a lobe 114 attached to a vehicle rail 1. As can be seen in FIGS. 24, 25, and 26, lobe 114 can include impact arm 14, reactionary arm 16, and base 22. Impact arm 14 and reactionary arm 16 can include multilayer structures as illustrated. In FIG. 26, lobe 114 has two bases 22, with each having a multilayer structure. Multiple bases can be desirable in structures having sharp curvature changes, e.g., a vehicle rail having sharp curvature changes.

The vehicle energy absorbing system is further illustrated by the following non limiting examples. Unless otherwise specified, all examples were based upon simulations.

EXAMPLES

Example 1

Figure 27:
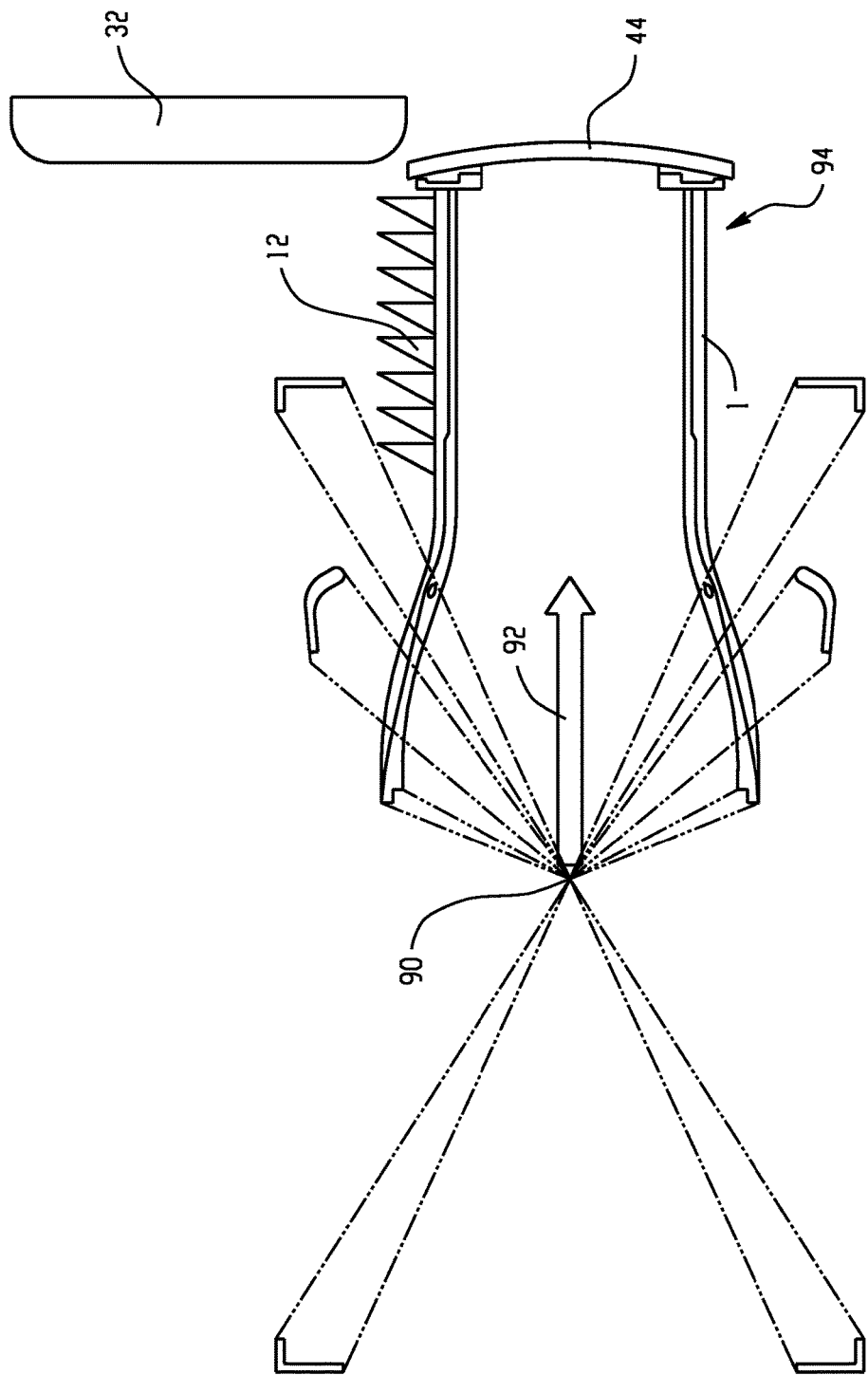
FIG. 27 is a top view of a schematic design for simulations conducted with a vehicle energy absorbing system.
Figure 28:
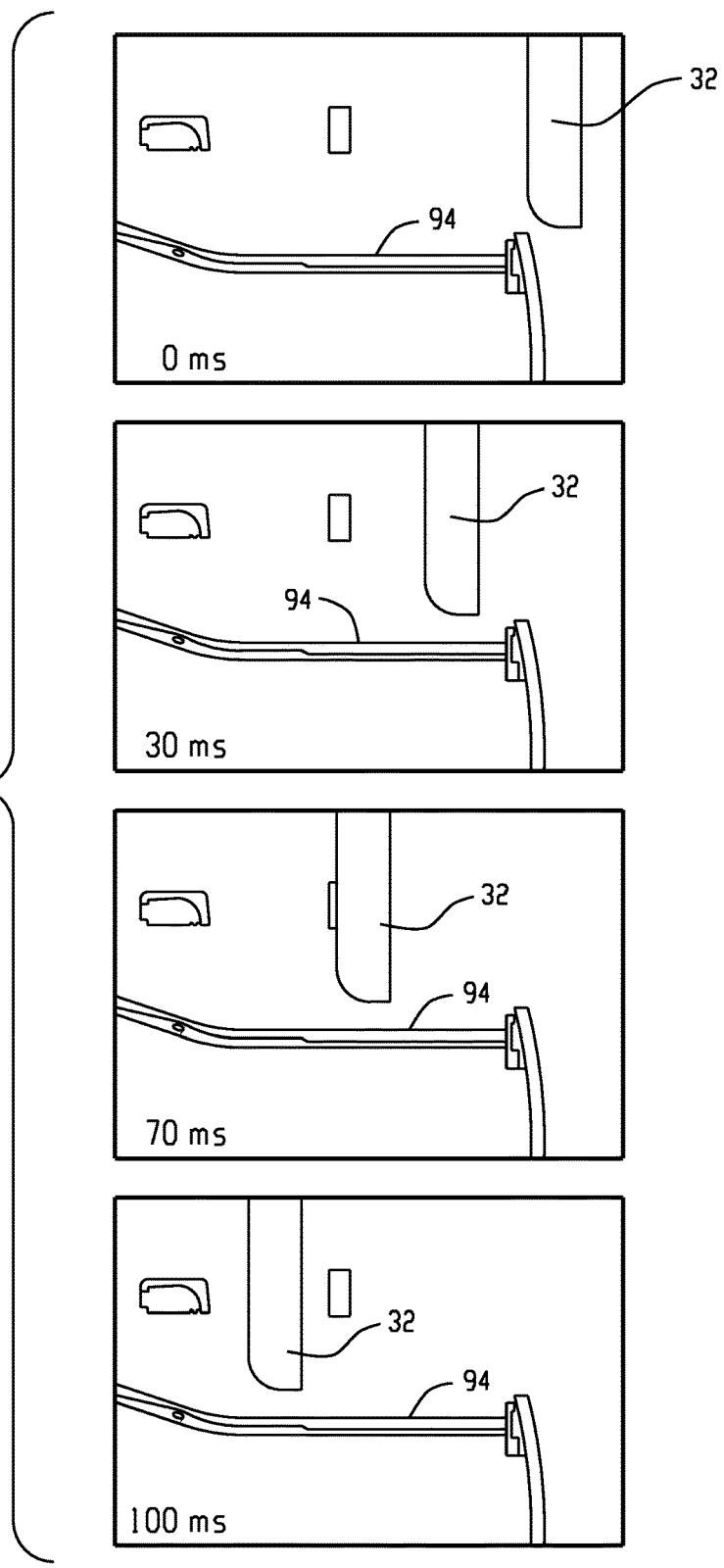
FIG. 28 is a pictorial representation of the results from simulations conducted on a vehicle without a vehicle energy absorbing system.
Figure 29:
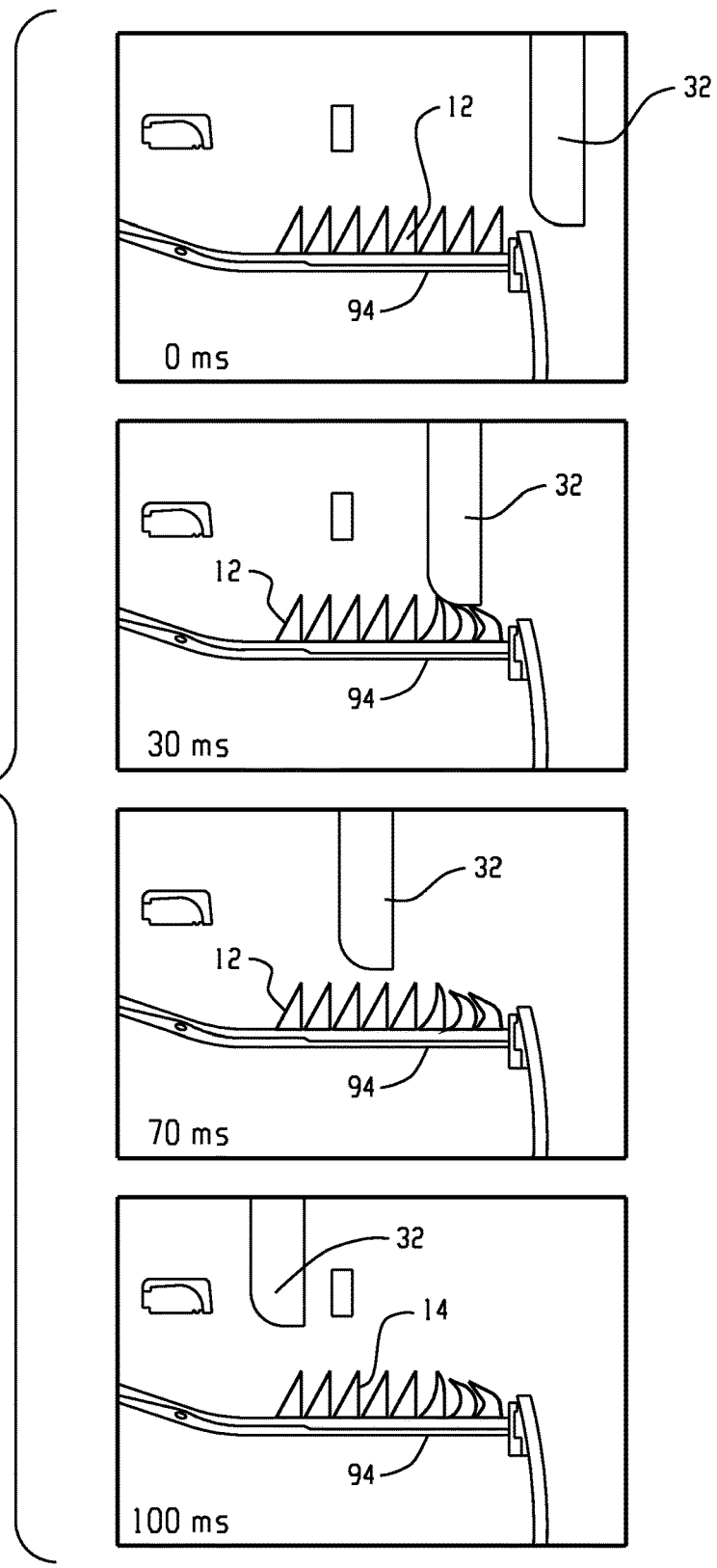
FIG. 29 is a pictorial representation of the results from simulations conducted on a vehicle with a vehicle energy absorbing system.
Figure 30:
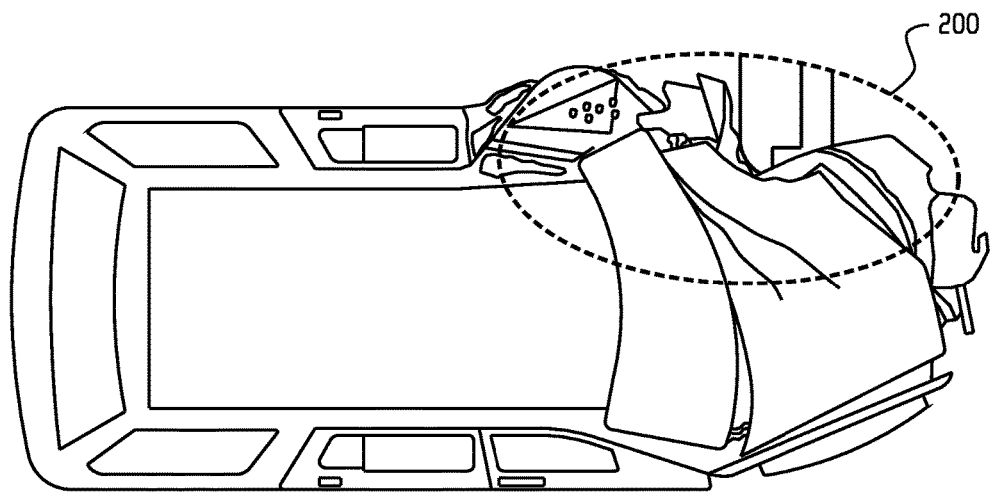
FIG. 30 is a pictorial representation of the results from simulations conducted on a vehicle without a vehicle energy absorbing system.
Figure 31:
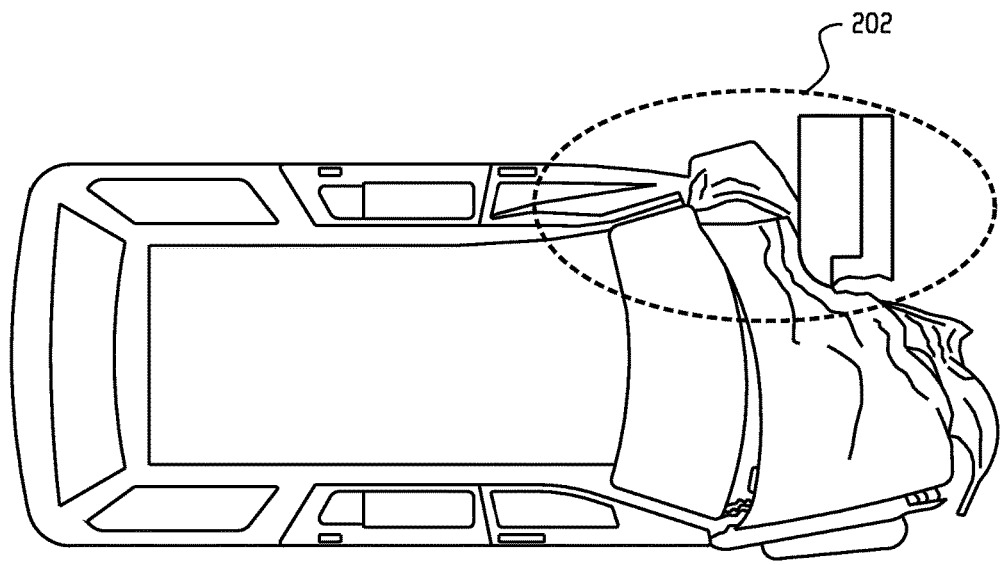
FIG. 31 is a pictorial representation of the results from simulations conducted on a vehicle with a vehicle energy absorbing system.

A rigid material is used for the impactor and the base is modelled using a blend of polyphenylene ether (PPE) and polyamide (PA) (NORYL GTX™), a thermoplastic material having a modulus of 2.5 GigaPascals (GPa) and a failure strain of 60% using LS-DYNA™ software. As described herein, a "rigid material" refers to a material that does not deform. In this example, a rigid material constrained in all directions with steel properties (e.g., modulus of approximately 210 GPa) is used. In the following examples, a component level simulation is performed using a vehicle rail with the vehicle energy absorbing system disclosed in FIG. 3 and compared to a vehicle rail without the vehicle energy absorbing system. The simulation design is illustrated in FIG. 27 where lobes 12 are attached to the vehicle rail 1 of vehicle 94. Direction of travel 92 of vehicle 94 is forward. A vehicle mass of 1,500 kilograms (kg) is considered and extra elemental mass is applied at the center of gravity 90 to achieve a realistic vehicle mass. In this example, the rails weigh 50 g and so therefore, 1,450 kg are added as extra mass. The system was moved in the forward direction 94 at a speed of 64 kph to an impactor 32 (e.g., a fixed, rigid barrier), that hardly contacts the front beam 44 and rail 1. Results from the impact are illustrated in FIGS. 28 and 29, where FIG. 28 is directed to a vehicle without the vehicle energy absorbing system and FIG. 29 is directed to a vehicle with the vehicle energy absorbing system. Measurements were taken at 0 milliseconds (ms), 30 ms, 70 ms, and 100 ms. As can be seen from FIGS. 28 and 29, the vehicle with the vehicle energy absorbing system begins to move away from the impactor 32, whereas the vehicle without the vehicle energy absorbing system moves in the same direction as the impact velocity, indicating that the vehicle energy absorbing system is effective in reducing injury to the occupant since the impactor is moved away from the vehicle and thus, does not intrude into the occupant compartment. This can be seen in FIGS. 30 and 31, wherein FIG. 30 is directed to a vehicle without the presently disclosed vehicle energy absorbing system and FIG. 31 is directed to a vehicle with the presently disclosed vehicle energy absorbing systems. As can be seen by area 200 in FIG. 30 and area 202 in FIG. 31, the vehicle without the vehicle energy absorbing system disclosed herein (FIG. 30) had more intrusion into the vehicle compartment than the vehicle containing the vehicle energy absorbing system disclosed herein (FIG. 31).

The vehicle energy absorbing systems and methods of making disclosed herein include at least the following embodiments:

Embodiment 1

A vehicle energy absorbing system for a high-speed, small-overlap impact, comprising: lobes spaced intermittently along a vehicle rail, wherein the lobes include an impact arm, a reactionary arm, and a base, wherein a shape of the base is complimentary to a shape of the vehicle rail and wherein the impact arm and the reactionary arm protrude outwardly from the base and the vehicle rail, wherein a channel is formed in the space between the base, the impact arm, and the reactionary arm, wherein the channel extends through the lobe from end to end; wherein the lobes have a geometrical configuration and comprise a material designed to absorb energy upon collision with an impactor; or deflect the vehicle away from an impactor; or transfer energy to the vehicle rails; or absorb energy upon collision with an impactor and deflect the vehicle away from an impactor; or absorb energy upon collision with an impactor and transfer energy to the vehicle rails.

Embodiment 2

The vehicle energy absorbing system of Embodiment 1, wherein the lobe further comprises a cover over the channel on one end of the lobe.

Embodiment 3

The vehicle energy absorbing system of Embodiment 1, wherein the lobe further comprises a cover over each end of the lobe.

Embodiment 4

The vehicle energy absorbing system of any of Embodiments 1-3, wherein the lobes are spaced intermittently along an A pillar of the vehicle.

Embodiment 5

The vehicle energy absorbing system of any of Embodiments 1-4, wherein the vehicle energy absorbing system comprises greater than or equal to 2 individual lobes.

Embodiment 6

The vehicle energy absorbing system of any of Embodiments 1-4, wherein the vehicle energy absorbing system comprises greater than or equal to 2 interconnected lobes.

Embodiment 7

The vehicle energy absorbing system of any of Embodiments 1-6, wherein the lobes comprise a material selected from a metallic material, a polymeric material, a composite material, or a combination comprising at least one of the foregoing.

Embodiment 8

The vehicle energy absorbing system of any of Embodiments 1-7, wherein the lobes have a geometrical shape selected from a triangle, a cone, a pyramid, a cylinder, a square, a rectangle, a parallelogram, trapezium, elliptical, hexagonal, or a combination comprising at least one of the foregoing.

Embodiment 9

The vehicle energy absorbing system of any of Embodiments 1-7, wherein the impact arm or the reactionary arm or the impact arm and the reactionary arm includes a corrugated shape.

Embodiment 10

The vehicle energy absorbing system of any of Embodiments 1-9, further comprising greater than or equal to 2 impact arms.

Embodiment 11

The vehicle energy absorbing system of any of Embodiments 1-10, further comprising greater than or equal to 2 reactionary arms.

Embodiment 12

The vehicle energy absorbing system of any of Embodiments 1-11, wherein the impact arm and the reactionary arm converge from the base at an angle.

Embodiment 13

The vehicle energy absorbing system of Embodiment 12, wherein the impact arm and the reactionary arm converge toward one another and meet at a point.

Embodiment 14

The vehicle energy absorbing system of any of Embodiments 1-11, wherein the impact arm and the reactionary arm converge toward an interface disposed between the arms, and optionally, wherein the impact arm and the reactionary arm converge from the base at an angle.

Embodiment 15

The vehicle energy absorbing system of any of Embodiments 12-14, wherein the angle is 0° to 45°.

Embodiment 16

The vehicle energy absorbing system of any of Embodiments 1-15, wherein the impact arm has a length, $l_1$, and the reactionary arm has a length, $l_2$, wherein $l_1$ is equal to $l_2$ or wherein $l_1$ is not equal to $l_2$.

Embodiment 17

The vehicle energy absorbing system of any of Embodiments 1-16, wherein the lobes comprise a multilayer structure in the channel.

Embodiment 18

The vehicle energy absorbing system of Embodiment 17, wherein the multilayer structure includes ribs disposed in the layers.

Embodiment 19

A vehicle energy absorbing system for a high-speed, small-overlap impact, comprising: lobes spaced intermittently along a vehicle rail, wherein the lobes include a honeycomb structure protruding outwardly from the vehicle rail at an angle thereto; wherein the lobes comprise a material designed to absorb energy upon collision with an impactor; or deflect the vehicle away from an impactor; or absorb energy upon collision with an impactor and deflect the vehicle away from an impactor.

Embodiment 20

The vehicle energy absorbing system of Embodiment 19, wherein honeycomb structure extends from the base at an angle of 0° to 45°.

Embodiment 21

The vehicle energy absorbing system of Embodiment 19 or Embodiment 20, wherein the honeycomb structure is crushed axially along a length, $l_h$, after collision with an impactor.

Embodiment 22

The vehicle energy absorbing system of any of Embodiments 1-21, wherein the base is attached to the vehicle rail with a mechanism selected from hooks, snap-fit, mechanical fastener, structural adhesive, or a combination comprising at least one of the foregoing.

Embodiment 23

A vehicle comprising the vehicle energy absorbing system of any of Embodiments 1-22.

Embodiment 24

A method of making a vehicle energy absorbing system, comprising: forming lobes comprising an impact arm, a reactionary arm, and a base, wherein a shape of the base is complimentary to a shape of a vehicle rail to which the lobe is attached and wherein the impact arm and the reactionary arm protrude outwardly from the base and the vehicle rail, wherein a channel is formed in the space between the base, the impact arm, and the reaction arm, wherein the channel extends through the lobe from end to end; and attaching the base of the lobes intermittently to the vehicle rail.

Embodiment 25

The method of Embodiment 24, wherein the attaching includes hooks, a snap-fit connection, a mechanical fastener, a structural adhesive, or a combination comprising at least one of the foregoing.

Embodiment 26

The method of Embodiment 24 or Embodiment 25, wherein the vehicle energy absorbing system comprises greater than or equal to 2 individual lobes or wherein the vehicle energy absorbing system comprises greater than or equal to 2 interconnected lobes.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless otherwise specified herein, any reference to standards, regulations, testing methods and the like, such as ASTM D256, ASTM D638, ASTM D790, ASTM D1238, ASTM D 4812, ASTM 4935, and UL94 refer to the standard, regulation, guidance or method that is in force at the time of filing of the present application.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A vehicle energy absorbing system for a high-speed, small-overlap impact, comprising:
lobes spaced intermittently along a vehicle rail, wherein the lobes include an impact arm, a reactionary arm, and a base, wherein a shape of the base is complimentary to a shape of the vehicle rail and wherein the impact arm and the reactionary arm protrude outwardly from the base and the vehicle rail, wherein a channel is formed in the space between the base, the impact arm, and the reactionary arm, wherein the channel extends through the lobe from end to end;
wherein the lobes have a geometrical configuration and comprise a material designed to
absorb energy upon collision with an impactor; or
deflect the vehicle away from an impactor; or
transfer energy to the vehicle rails; or
absorb energy upon collision with an impactor and deflect the vehicle away from an impactor; or
absorb energy upon collision with an impactor and transfer energy to the vehicle rails;
wherein the impact arm and the reactionary arm converge from the base at an angle and wherein the angle is 0° to 45°.

2. The vehicle energy absorbing system of claim 1, wherein the lobe further comprises a cover over the channel on one end of the lobe or wherein the lobe further comprises a cover over each end of the lobe.

3. The vehicle energy absorbing system of claim 1, wherein the lobes are spaced intermittently along an A pillar of the vehicle and along the vehicle rails.

4. The vehicle energy absorbing system of claim 1, wherein the lobes comprise a material selected from a metallic material, a polymeric material, a composite material, or a combination comprising at least one of the foregoing.

5. The vehicle energy absorbing system of claim 1, wherein the lobes have a geometrical shape selected from a triangle, a cone, a pyramid, a cylinder, a square, a rectangle, a parallelogram, trapezium, elliptical, hexagonal, or a combination comprising at least one of the foregoing.

6. The vehicle energy absorbing system of claim 1, wherein the impact arm or the reactionary arm or the impact arm and the reactionary arm includes a corrugated shape.

7. The vehicle energy absorbing system of claim 1, further comprising greater than or equal to 2 impact arms or further comprising greater than or equal to 2 reactionary arms.

8. The vehicle energy absorbing system of claim 1, wherein the impact arm and the reactionary arm converge toward an interface disposed between the arms.

9. The vehicle energy absorbing system of claim 1, wherein the impact arm has a length, $l_1$, and the reactionary arm has a length, $l_2$, wherein $l_1$ is equal to $l_2$ or wherein $l_1$ is not equal to $l_2$.

10. The vehicle energy absorbing system of claim 1, wherein the lobes comprise a multilayer structure in the channel.

11. The vehicle energy absorbing system of claim 1, wherein the base is attached to the vehicle rail with a mechanism selected from hooks, snap-fit, mechanical fastener, structural adhesive, or a combination comprising at least one of the foregoing.

12. A vehicle comprising the vehicle energy absorbing system of claim 1.

13. A vehicle energy absorbing system for a high-speed, small-overlap impact, comprising:
lobes spaced intermittently along a vehicle rail, wherein the lobes include a honeycomb structure protruding outwardly from the vehicle rail at an angle thereto;
wherein the lobes comprise a material designed to
absorb energy upon collision with an impactor; or
deflect the vehicle away from an impactor; or
absorb energy upon collision with an impactor and deflect the vehicle away from an impactor; wherein the honeycomb structure extends from the base at an angle of 0° to 45°.

14. The vehicle energy absorbing system of claim 13, wherein the honeycomb structure is crushed axially along a length, $l_h$, after collision with an impactor.

15. A method of making a vehicle energy absorbing system, comprising:
forming lobes comprising an impact arm, a reactionary arm, and a base, wherein a shape of the base is complimentary to a shape of a vehicle rail to which the lobe is attached and wherein the impact arm and the reactionary arm protrude outwardly from the base and the vehicle rail, wherein a channel is formed in the space between the base, the impact arm, and the reaction arm, wherein the channel extends through the lobe from end to end; and
attaching the base of the lobes intermittently to the vehicle rail;
wherein the impact arm and the reactionary arm converge from the base at an angle and wherein the angle is 0° to 45°.

* * * * *